3,278,522
MODIFIED STARCH
Arthur Murray Goldstein, Plainview, and Arthur Francis Kohl, Valley Stream, N.Y., and Paul Kaplan, Wilton, Conn., assignors to Stein, Hall & Co., Inc., New York, N.Y., a corporation of New York
No Drawing. Filed Jan. 8, 1963, Ser. No. 250,011
7 Claims. (Cl. 260—233.3)

This invention relates to a process for modifying starch. More particularly, it is concerned with the modified starch therefrom having improved properties.

It is known that unmodified starch has certain characteristics that may be commercially undesirable. For example, unmodified starch lacks heat stability. If a thick pasty mass of cooked starch is heated in a bath of boiling water, the starch becomes progressively thinner. If prolonged heating at high temperatures is employed, the starch decreases in viscosity and becomes relatively fluid, particularly under the influence of agitation or pumping.

Furthermore, starch paste after cooking sets up and forms an opaque gel or tends to lose the ability to flow freely, especially on cooling. This is due to retrogradation wherein a part of the starch aggregates progressively and finally forms a stiff gel which will not readily regain its normal flow properties on reheating.

Another commercially unsuitable feature of unmodified starch, somewhat related to retrogradation, is the lack of freeze-thaw stability. In other words, when aqueous dispersions of starch, such as those used in pie fillings, are subjected to repeated freezing and thawing cycles, there is a distinct loss in water-holding power of the starch, resulting in syneresis, or an exudation of liquid together with a marked deterioration in texture and clarity.

It is necessary for starch to have acid stability when used with fruits and fruit juices. Furthermore, if the starch is employed in milk products, e.g., custard, which normally have a relatively high pH, e.g., 6½, there should be no acid groups formed in the milk products to break down the starch during a subsequent treating process and no curdling therefrom.

In the past (U.S. Pat. No. 2,516,633), starch has been partially etherified with an alkylene oxide without altering the apparent granule structure to form a product having little tendency to gel or retrograde even at refrigeration temperatures. This modified starch, on the other hand, does not have adequate heat stability for certain commercial aspects.

Starch has also been reacted (U.S. Pat. No. 2,328,537) with phosphorus oxychloride to decrease the rate of thinning of an aqueous starch suspension on heating. However, this ester cross-linking treatment with phosphorus oxychloride has an adverse effect upon the freeze-thaw stability of the starch and retrogradation is actually increased.

In order to improve stability and resistance to syneresis upon exposure to low temperature storage or repeated freezing and thawing, starch has been reacted with either epichlorohydrin, which is polyfunctional, or phosphorus oxychloride and subsequently reacted with either acetic anhydride or propionic anhydride (U.S. Pat. No. 2,935,510). However, the product therefrom is an ester starch and its acid group, if liberated, will curdle milk products.

Therefore, prior to the present invention, it has not been possible to provide a modified starch having all the following properties: heat stability, acid stability, freeze-thaw stability and lack of retrogradation. It has now been discovered that all four of these properties are found in a starch product provided that the starch is modified with both an alkylene oxide and phosphorus oxychloride and provided that a critical viscosity is employed.

Thus, in accordance with one embodiment of this invention, starch in an alkaline slurry is reacted with an alkylene oxide, e.g., propylene oxide. The alkylene oxide-modified starch in the slurry is then reacted with phosphorus oxychloride. The alkylene oxide-modified, phosphorus oxychloride-modified starch is subsequently recovered therefrom. The final recovered product has a viscosity up to 1800 Brabender units, preferably 1000 to 1800 Brabender units. The measurement of viscosity in Brabender units (B.U.) is known in the art and is determined by the Brabender Amylograph-Viscograph. In another embodiment, the first reaction may be the modification of starch with phosphorus oxychloride and the second reaction may be the modification with an alkylene oxide.

The starches applicable to this invention are the common starches, i.e., those whose amylose content is in the range of about 20% to 30%. This includes, among others, corn, potato, tapioca, wheat and sago starch.

In this invention, it is customary to form initially an aqueous slurry of the starch. For example, starch, after being separated from the other constituents in a cereal grain, is transported in a water slurry containing about 40% to 45% starch at temperatures substantially below the normal gelatinization range of the starch.

In order to provide the final product within the desired viscosity, it is advantageous, although not necessary, to reduce the viscosity of the starch slurry with a strong acid before the reaction with propylene oxide and phosphorus oxychloride. This acid treatment may be accomplished by heating the slurry with unmodified starch therein to a temperature somewhat below the gelatinization point of the starch and by adding subsequently hydrochloric acid, sulfuric acid or the like in an amount sufficient to provide a peak viscosity generally between about 400 and 600 B.U. at a concentration of 30 g. starch (dry basis) with 450 ml. of water.

The pH of the starch slurry with or without the aforementioned acid treatment is then increased to a range of about 10 to 12. Any alkali may be employed to accomplish this result, e.g., alkaline earth hydroxides, alkali metal hydroxides, salts which liberate alkali upon reaction with water, salts which react with the alkylene oxide in the presence of water to produce alkali, salts of weak acids or mixtures thereof. However, the alkali metal hydroxides, e.g., sodium hydroxide, are preferred. Generally, a gelatinization inhibitor, e.g., sodium sulfate, is also included therein. For example, a suitable procedure is to add 5% sodium sulfate and to add subsequently a sufficient quantity of a 5% sodium hydroxide solution to form an alkaline slurry having a pH of 10.5. In describing this invention, the percentages are based upon the weight of the commercial starch which may contain 10%–20% moisture.

The starch in the alkaline slurry is subsequently reacted with an alkylene oxide and phosphorus oxychloride. Although the starch may be modified firstly with phosphorus oxychloride and secondly with an alkylene oxide, the method generally employed is to modify the starch initially with an alkylene oxide and subsequently with phosphorus oxychloride. As defined herein, alkylene oxide covers the $C_2$ to $C_4$ alkyl compounds containing the ethylene oxide structure as shown herebelow:

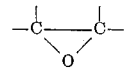

Although this includes ethylene oxide, and butylene oxide, proplyene oxide is preferred. An amount up to about 12% alkylene oxide, e.g., propylene oxide, may be reacted with the starch, preferably about 4% to 8%. Any suitable type of equipment commonly used in the starch industry may be used herein. For example, starch may be reacted with propylene oxide in covered tanks equipped with agitators. Generally, the reaction is performed at a temperature of from 35° to 45° C. although somewhat higher or lower temperatures may be used, depending on the degree of alkalinity of the reaction mixture, the type of starch and the time allowed for the reaction. The alkylene oxide may be introduced by conducting the liquid or gaseous phase through a pipe to the bottom of the tank at a rate slow enough to prevent undissolved bubbles from reaching the surface and escaping to the atmosphere. The slurry is then agitated until substantially all of the alkylene oxide has been reacted. For example, if propylene oxide is employed in the amount of 8% based on the starch, the reaction period may be 14 to 20 hours under reflux, although shorter periods of time have been sufficient to produce the desired results when higher temperatures or alkalinity have been used.

The alkylene oxide-modified starch is then reacted with phosphorus oxychloride in an amount up to 0.1%. Preferably the alklene oxide-modified starch is reacted with 0.03% to 0.05% of phosphorus oxychloride. Room temperature is ordinarily sufficient; however, mild heating, e.g., about 40° C., may speed the reaction. The phosphorus oxychloride is generally added slowly with stirring. To complete the reaction, it may be necessary to maintain agitation up to 24 hours, although 1 to 2 hours is usually satisfactory.

The alkylene oxide-modified, phosphorus oxychloride-modified starch may be recovered by any procedure known in the art to provide a final product. For example, the modified starch may be dewatered, washed, and dried by the methods ordinarily used in the starch industry or the slurry may be used with or without washing and neutralizing in various industrial applications. The slurry may be neutralized with acidic materials to a pH of between 5 and 7, or the starch dewatered, washed and dried without neutralization, thus leaving the product alkaline. A preferred recovery procedure is to neutralize with hydrochloric acid to a pH of 5.0, dilute and let settle, decant, centrifuge and dry.

It is important for the success of this invention to form a final dry modified starch product with a critical viscosity not greater than about 1800 B.U., e.g., 1000 to 1800 B.U. The viscosity of the final product, as defined herein, is the viscosity after 40 g. of the modified starch (12% moisture) is slurried at 50° C. with 460 ml. of water, heated to 95° C. and held for 20 minutes, and cooled with water to 50° C. and held for 15 minutes. To arrive at the required value, the viscosity during the process may be controlled by varying the amount of acid employed in the acid treatment, by varying the amount of propylene oxide employed in the propylene oxide reaction and by varying the amount of phosphorus oxychloride during the phosphorus oxychloride reaction.

Thus, in accordance with the present invention, it is now possible to prepare a modified starch which has acid stability, heat stability, freeze-thaw stability and lack of retrogradation. However, it is essential to react the starch with both phosphorus oxychloride and an alkylene oxide to form a final product having a viscosity up to 1800 B.U.

The following examples are submitted to illustrate but not to limit this invention. Unless otherwise indicated, all parts and percentages in the specification are based upon weight.

*Example I*

One part tapioca starch was slurried with 1.5 parts water in a covered tank with agitation. The slurry was heated to 40° C. and 2% concentrated hydrochloric acid was added thereto until the viscosity was 500 B.U. After stirring for about 3½ hours, 5% sodium sulfate was added and a 5% sodium hydroxide solution was added to provide an alkaline slurry with a pH of 10.5.

The starch in this alkaline slurry was subsequently reacted with 8% propylene oxide in conjunction with agitation overnight for 20 hours under reflux. The propylene oxide-modified starch was then reacted with 0.03% phosphorus oxychloride with agitation for 1¼ hours.

The propylene oxide-modified, phosphorus oxychloride-modified starch was recovered by neutralizing with hydrochloric acid to a pH of 5.0, diluting with 3 parts of water for 1 part of starch, decanting, centrifuging and drying in a flash drier at about 300° F. The final recovered product had a viscosity of 1070 B.U., as determined by forming a slurry, heating, etc., heretofore described.

Acid stability and heat stability were determined by providing a slurry of the final modified starch with sufficient citric acid therein to form a pH of 3.5 and by measuring the viscosity during a heating cycle. The starch product prepared in accordance with this example had excellent acid stability and excellent heat stability.

Freeze-thaw stability was measured by placing in a jar the starch paste after the aforementioned viscosity of 1070 B.U. was determined, putting the jar into a freezer at −25° F. overnight, removing the jar thereafter, thawing and noting the properties of the starch therein. This procedure was repeated 5 times and the properties of the starch were noted after each cycle.

The instant propylene oxide-modified, phosphorus oxychloride-modified starch had little breakdown indicating freeze-thaw stability. Furthermore, there was no retrogradation of this modified starch.

*Example II*

The procedure of Example I was substantially repeated except that the starch was reacted with .045% phosphorus oxychloride after the reaction with propylene oxide. The viscosity of the final modified starch product was 1530 B.U.

The modified starch had acid stability, heat stability and freeze-thaw stability. Moreover, no retrogradation was noted.

*Example III*

For the purposes of control, one portion of tapioca starch was reacted with only 8% propylene oxide. Another portion of tapioca starch was reacted with only .03% phosphorus oxychloride. Final products were obtained therefrom in a manner as described in Example I.

The propylene oxide-modified starch product did not have heat stability nor acid stability. The phosphorus oxychloride-modified starch product did not have freeze-thaw stability. Furthermore, an admixture of the propylene oxide-modified starch and phosphorus oxychloride-modified starch would not have suitable stability properties.

This example demonstrates the necessity of reacting a common starch with both propylene oxide and phosphorus oxychloride in order to form a product which is heat stable, acid stable and also freeze-thaw stable.

*Example IV*

The procedure of Example I was repeated except that the starch was reacted firstly with .045% phosphorus oxychloride and secondly with 4% propylene oxide.

The final product had a viscosity of 1125 B.U. and had acid stability, heat stability and freeze-thaw stability.

*Example V*

A phosphorus oxychloride-modified, propylene oxide-modified starch was prepared in a similar manner as described in Example IV except that 6% propylene oxide was used.

The final modified product, which had a viscosity of 1925 B.U., did not have acid stability nor heat stability.

It is manifest from Examples IV and V that the viscosity of the final starch product reacted with both phosphorus oxychloride and propylene oxide is critical, i.e., it must not be higher than 1800 B.U. If the viscosity is higher, an unsatisfactory product is formed.

*Example VI*

Tapioca starch was reacted with 6% ethylene oxide, the stoichiometric equivalent of 8% propylene oxide. The ethylene oxide-modified starch was then reacted with .03% phosphorus oxychloride. Otherwise, the procedures of Example I were followed to provide a modified starch.

The final product had a viscosity of 1540 B.U. and was acid stable, heat stable and freeze-thaw stable.

*Example VII*

Potato starch was modified in a similar manner as described in Example I by reacting it with 8% propylene oxide and subsequently with 0.1% phosphorus oxychloride.

The final modified starch, having a viscosity of 1450 B.U., had acid stability, heat stability and freeze-thaw stability.

Having set forth the general nature and specific embodiments of the present invention, the true scope is now particularly pointed out in the appended claims.

What is claimed is:

1. A process which comprises forming an aqueous slurry of starch; treating said slurry with an acid; incorporating an alkali into said acid-treated slurry in an amount sufficient to form a pH between 10 and 12; reacting the starch in said alkaline slurry with an amount up to about 12% of an alkylene oxide and with an amount up to about 0.1% of phosphorus oxychloride; and recovering an ungelatinized modified starch therefrom having a viscosity of not higher than about 1800 B.U. by varying the amount of acid employed in the acid treatment, by varying the amount of alkylene oxide employed during the alkylene oxide reaction and by varying the amount of phosphorus oxychloride during the phosphorus oxychloride reaction and having acid stability, heat stability, freeze-thaw stability and lack of retrogradation.

2. The process according to claim 1 in which the alkylene oxide is propylene oxide.

3. A process which comprises forming an aqueous slurry of about 40% to 45% common starch; treating said slurry with an acid to provide a peak viscosity between about 400 and 600 B.U.; incorporating an alkali into said acid-treated slurry in an amount sufficient to form a pH between 10 and 12; reacting the starch in said alkaline slurry with an amount up to about 12% of an alkylene oxide; reacting said alkylene oxide-reacted starch in said alkaline slurry with an amount up to about 0.1% of phosphorus oxychloride; and recovering an ungelatinized modified starch therefrom having a viscosity of 1000 to 1800 B.U. by varying the amount of acid employed in the acid treatment, by varying the amount of alkylene oxide employed during the alkylene oxide reaction and by varying the amount of phosphorus oxychloride during the phosphorus oxychloride reaction and having acid stability, heat stability, freeze-thaw stability and lack of retrogradation.

4. A process which comprises forming an aqueous slurry of about 40% to 45% common starch; treating said slurry with an acid to provide a peak viscosity between about 400 and 600 B.U.; incorporating an alkali into said acid-treated slurry in an amount sufficient to form a pH between 10 and 12; reacting the starch in said alkaline slurry with an amount up to about 0.1% phosphorus oxychloride; reacting said phosphorus oxychloride-reacted starch in said alkaline slurry with an amount up to about 12% of an alkylene oxide; and recovering an ungelatinized modified starch therefrom having a viscosity of 1000 to 1800 B.U. by varying the amount of acid employed in the acid treatment, by varying the amount of alkylene oxide employed during the alkylene oxide reaction and by varying the amount of phosphorus oxychloride during the phosphorus oxychloride reaction and having acid stability, heat stability, freeze-thaw stability and lack of retrogradation.

5. A process which comprises forming an aqueous slurry of 40% tapioca starch; treating said slurry with hydrochloric acid to provide a peak viscosity of 500 B.U.; incorporating 5% sodium sulfate and a 5% sodium hydroxide solution into said acid-treated slurry to form a pH of 10.5; reacting the starch in said slurry with 8% propylene oxide; reacting said propylene oxide-reacted starch with 0.03% phosphorus oxychloride; and recovering an ungelatinized modified starch therefrom by neutralizing with hydrochloric acid to a pH of 5.0, diluting with water, decanting, centrifuging and drying; said recovered ungelatinized modified starch having a viscosity of 1070 B.U. by varying the amount of acid employed in the acid treatment, by varying the amount of propylene oxide employed during the propylene oxide reaction and by varying the amount of phosphorus oxychloride during the phosphorus oxychloride reaction and having acid stability, heat stability, freeze-thaw stability and lack of retrogradation.

6. An ungelatinized starch prepared by the process of claim 1.

7. An ungelatinized starch prepared by the process of claim 5.

References Cited by the Examiner
UNITED STATES PATENTS

| 2,853,484 | 9/1958 | Lolkema et al. | 260—233.3 |
| 2,935,510 | 5/1960 | Wurzburg | 260—233.3 |

LEON J. BERCOVITZ, *Primary Examiner.*

R. MULCAHY, *Assistant Examiner.*